United States Patent
Cansino et al.

(10) Patent No.: US 9,854,054 B2
(45) Date of Patent: *Dec. 26, 2017

(54) MSS HEADEND CACHING STRATEGIES

(71) Applicant: The DIRECTV Group, Inc., El Segundo, CA (US)

(72) Inventors: Don E. Cansino, Redondo Beach, CA (US); Brady C. Tsurutani, Los Angeles, CA (US); Yuming M. Wang, West Covina, CA (US); Bhavyank V. Shah, Los Angeles, CA (US); Yue L. Wu, Torrance, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,816

(22) Filed: Aug. 18, 2016

(65) Prior Publication Data

US 2016/0360002 A1    Dec. 8, 2016

Related U.S. Application Data

(63) Continuation of application No. 13/682,700, filed on Nov. 20, 2012, now Pat. No. 9,432,444.

(Continued)

(51) Int. Cl.
| | |
|---|---|
| *G06F 15/167* | (2006.01) |
| *H04L 29/08* | (2006.01) |
| *H04N 21/2225* | (2011.01) |
| *H04N 21/231* | (2011.01) |
| *H04N 21/239* | (2011.01) |

(Continued)

(52) U.S. Cl.
CPC .... *H04L 67/2842* (2013.01); *G06F 17/30312* (2013.01); *G06F 17/30569* (2013.01); *G06F 17/30864* (2013.01); *H04L 67/2885* (2013.01); *H04N 21/2225* (2013.01); *H04N 21/2393* (2013.01); *H04N 21/23106* (2013.01); *H04N 21/6131* (2013.01); *H04L 12/18* (2013.01);
(Continued)

(58) Field of Classification Search
CPC . H04L 67/2842; H04L 12/18; H04L 67/2885; H04L 67/42; H04L 67/06; H04L 69/04; H04L 29/08; H04N 21/2225; H04N 21/23106; H04N 21/2393; H04N 21/6131; G06F 17/30
See application file for complete search history.

(56) References Cited

U.S. PATENT DOCUMENTS

2002/0184340 A1* 12/2002 Srivastava ........ G06F 17/30908
709/219
2004/0128285 A1*  7/2004 Green ............... G06F 17/30864

(Continued)

*Primary Examiner* — Cheikh Ndiaye
(74) *Attorney, Agent, or Firm* — Gates & Cooper LLP

(57) ABSTRACT

Systems and methods for caching data and generating responses to data requests are disclosed. A content delivery system for sending requested data to a client based on a client request in accordance with one or more embodiments of the present invention comprises a server for compiling data into a data cache, and a headend, coupled to the server, for obtaining the data, categorizing and storing the data in groups in an object cache, receiving a client request, picking data from the object cache and generating a response, and returning the response while caching the response in a response cache that is used to directly respond to future client requests.

18 Claims, 6 Drawing Sheets

Related U.S. Application Data

(60) Provisional application No. 61/562,857, filed on Nov. 22, 2011.

(51) Int. Cl.
    *H04N 21/61*     (2011.01)
    *G06F 17/30*     (2006.01)
    *H04L 12/18*     (2006.01)
    *H04L 29/06*     (2006.01)

(52) U.S. Cl.
    CPC .............. *H04L 67/06* (2013.01); *H04L 67/42* (2013.01); *H04L 69/04* (2013.01)

(56) References Cited

U.S. PATENT DOCUMENTS

| | | | |
|---|---|---|---|
| 2007/0156965 A1* | 7/2007 | Sundarrajan | H04L 67/42 711/133 |
| 2008/0228920 A1* | 9/2008 | Souders | H04L 67/2842 709/226 |
| 2008/0320222 A1* | 12/2008 | Dhodapkar | G06F 12/121 711/118 |
| 2012/0166574 A1* | 6/2012 | Harvell | G06F 15/167 709/217 |
| 2013/0080611 A1* | 3/2013 | Li | H04N 21/222 709/223 |
| 2013/0311612 A1* | 11/2013 | Dickinson | G06F 17/301 709/219 |

* cited by examiner

MSS HEADEND CACHING STRATEGIES

CROSS-REFERENCE TO RELATED APPLICATIONS

This application is a continuation under 35 U.S.C. §120 of application Ser. No. 13/682,700, filed on Nov. 20, 2012, now U.S. Pat. No. 9,432,444, issued on Aug. 30, 2016, with inventor(s) Dan E. Cansino, Brady C. Tsurutani, Yuming M. Wang, Bhavyank V. Shah, and Yue L. Wu, entitled "MSS Headend Caching Strategies," which application claims the benefit of Provisional Application Ser. No. 61/562,857, filed on Nov. 22, 2011, by Don E. Cansino, Brady C. Tsurutani, Yuming M. Wang, Bhavyank V. Shah, and Yue L. Wu, entitled "MSS HEADEND CACHING STRATEGIES".

BACKGROUND OF THE INVENTION

Field of the Invention

The present disclosure relates generally to content delivery and, more particularly, to content delivery systems and methods to operate the same.

Background of the Invention

The ever increasing proliferation and/or availability of media players (e.g., personal computers, digital video recorders (DVRs), home media centers, game playing system, etc.) creates a strong demand for systems, devices and/or methods to download video, audio and/or multimedia data, files and/or assets. Further, mobile platforms, such as laptop computers, cellular telephones, etc., also have demands for content via wireless services.

Delivery of the content is relatively understood in a wire medium such as cable, and still relatively easy in a large bandwidth wireless delivery system such as satellite broadcasting. However, mobile platforms do not always have a large bandwidth to receive or transmit data on.

Within that smaller bandwidth, there must also be systems in place to reduce piracy or other interception of the signals in a content delivery system.

From the foregoing, it can be seen, then, that there is a need in the art for methods to deliver content to mobile platforms. It can also be seen that there is a need in the art for an apparatus to deliver content to mobile platforms.

SUMMARY OF THE INVENTION

To minimize the limitations in the prior art, and to minimize other limitations that will become apparent upon reading and understanding the present specification, the present invention discloses systems and methods for sending requested data to a client based on client requests.

A content delivery system for sending requested data to a client based on a client request in accordance with one or more embodiments of the present invention comprises a two-stage caching strategy. An entire data set is retrieved from a backend web service/server in one big request. Data objects in the data set are sorted and grouped by categories, and saved in an object cache. Based on a client request, data objects are picked from the object cache and a client response (e.g., an XML string response) is generated. The client response is returned to the client, and at the same time, the client response is cached and keyed/indexed by the client request (e.g., a request URL). If the same request comes through again, the cached client response is returned directly from the response cache. The object cache is periodically refreshed (which may result in the clearing of the response cache).

Different variations may also implement a file caching strategy that saves the entire data set as a compressed file that is pushed to instances of the headend application that are executing. Alternatively or in addition, data may be cached for selected data chunks (e.g., based on a customizable time period).

In view of the above, the caching strategy of embodiments of the invention may be utilized in various web services and serve mobile/web clients that need sport games and score information. In addition, the caching strategy may be used to push programming guide/channel information/other information to mobile/web clients.

BRIEF DESCRIPTION OF THE DRAWINGS

Referring now to the drawings in which like reference numbers represent corresponding parts throughout.

DETAILED DESCRIPTION OF THE EMBODIMENTS

Figure 1:
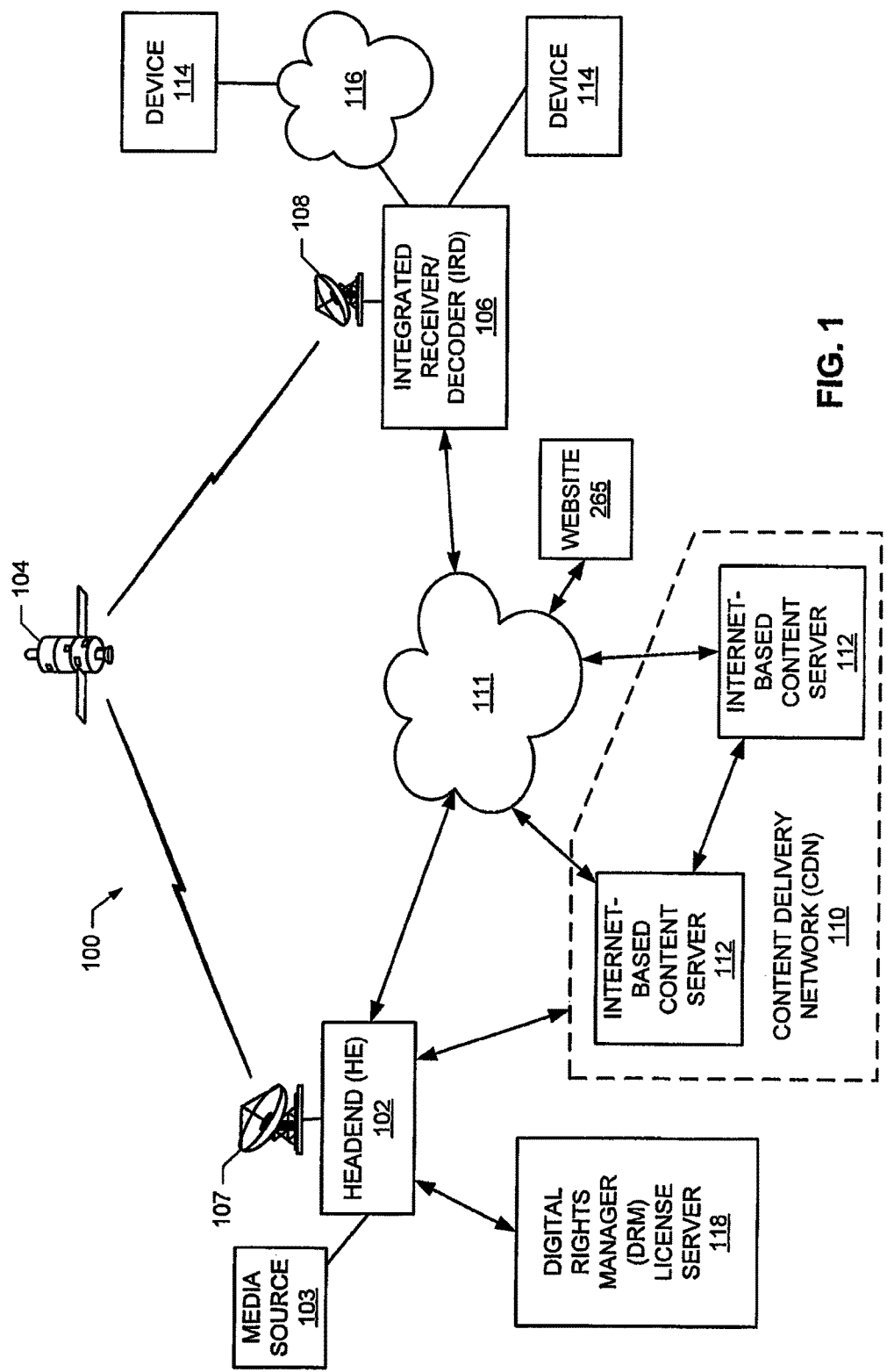
FIG. 1 is a schematic illustration of an example disclosed content delivery system.

In the following description, reference is made to the accompanying drawings which form a part hereof, and which is shown, by way of illustration, several embodiments of the present invention. It is to be understood that other embodiments may be utilized and structural changes may be made without departing from the scope of the present invention.

Overview

The present invention provides a multiple stage caching strategy for data delivery in a content delivery system. Typically, this is a two-stage strategy, where the entire data set is retrieved to a server (or point of presence) in a single request, and the data set is then sorted and grouped by category. Depending on the client request through the content delivery system, objects are retrieved and a response, typically an XML (extensible markup language) response, is generated and returned to the requesting client, and the response is cached and keyed by the requesting URL. Thus, if a similar request is sent again to the server, the cached XML response can be sent directly, and the cached XML response can be refreshed with new data as needed for future requests from various clients.

Such a strategy is particularly useful with regard to sports scores, where the majority of the data, e.g., team, game, sport, etc., is relatively static, and the only changes to the data string/XML response is the change in the score, game time, or field position. As such, the present invention allows for caching of smaller amounts of data, as well as transfer of smaller amounts of data through the communications system, to deliver the information to requesting devices.

Environment

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a headend (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

As illustrated in FIG. 1, an example direct-to-home (DTH) system 100 includes a transmission source 102 (e.g., a headend (HE) 102), a plurality of media sources, one of which is shown at reference numeral 103, a satellite and/or satellite relay 104 (i.e., satellite/relay 104) and a plurality of receiver stations (e.g., integrated receiver/decoders (IRDs)), one of which is shown at reference numeral 106 (i.e., IRD 106), between which wireless communications are exchanged. The wireless communications may take place at any suitable frequency, such as, for example, Ku-band frequencies. As described in detail below with respect to each portion of the example DTH system 100, information provided to the HE 102 from the media source 103 may be transmitted, for example, via an uplink antenna 107 to the satellite/relay 104, which may be at least one geosynchronous or geo-stationary satellite or satellite relay that, in turn, rebroadcasts the information over broad geographical areas on the earth that include the IRDs 106. Among other things, the example HE 102 of FIG. 1 provides program material to the IRDs 106 and coordinates with the IRDs 106 to offer subscribers pay-per-view (PPV) program services, including billing and associated decryption of video programs, as well as non-PPV programming. To receive the information rebroadcast by the satellite/relay 104, each IRD 106 is communicatively coupled to any variety of receive (i.e., downlink) antenna 108.

Security of assets broadcast via the satellite/relay 104 may be established by applying encryption to assets during content processing and/or during broadcast (i.e., broadcast encryption). For example, an asset can be encrypted based upon a codeword (CW) known to the HE 102 and known to the IRDs 106 authorized to view and/or playback the asset. In the illustrated example DTH system 100, for each asset the HE 102 generates a code word packet (CWP) that includes, among other things, a time stamp, and then determines the codeword (CW) for the asset by computing a cryptographic hash of the contents of the CWP. The CWP is also broadcast to the IRDs 106 via the satellite/relay 104. IRDs 106 authorized to view and/or playback the broadcast encrypted asset will be able to correctly determine the CW by computing a cryptographic hash of the contents in the received CWP. If an IRD 106 is not authorized, the IRD 106 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption within the scope of the present invention include for example, public/private key encryption and decryption.

In the illustrated example pay content delivery system 100, programs/information from the media source 103 may also be transmitted from the HE 102 to the IRDs 106 or to other clients, e.g., to mobile telephones or mobile internet users, via a content delivery network (CDN) 110. In the example of FIG. 1, the CDN 110 receives programs/information (e.g., an asset file containing a movie) from the HE 102 and makes the programs/information available for download to the IRDs 106 via a terrestrial communication link and/or network, such as, for example, an Internet connection and/or an Internet based network such as, for example, the Internet 111.

While the Internet 111 is a multipoint to multipoint communication network(s), persons of ordinary skill in the art will readily appreciate that point-to-point communications via any variety of point-to-point communication signals may be made via the Internet 111. For instance, in the example system of FIG. 1, an IRD 106 downloads an asset file from the CDN 110 using any variety of file transfers and/or file transfer protocols (FTP). Such file transfers and/or file transfer protocols are widely recognized as point-to-point communications, point-to-point communication signals and/or create point-to-point communication paths, even if transported via a multipoint to multipoint communication network such as the Internet 111. It will be further recognized that the Internet 111 may be used to implement any variety of broadcast systems wherein a broadcast transmitter may transmit any variety of data and/or data packets to any number and/or variety of clients and/or receiver simultaneously. Moreover, the Internet 111 may be used to simultaneously provide broadcast and point-to-point communications and/or point-to-point communication signals from any number of broadcast transmitters and/or CDNs 110. Throughout the following discussions, the downloading and/or transferring of asset files to an IRD 106 from a CDN 110 are assumed to be performed using point-to-point communications, point-to-point communication signals and/or point-to-point techniques. As discussed above, the Internet 111 is only an example communications network and/or communication media by which such point-to-point communications may be made.

The example CDN 110 of FIG. 1 may be implemented using any of a variety of techniques and/or devices, for instance, a plurality of Linux based servers (e.g., content servers 112) connected via wide bandwidth (i.e., high speed) fiber optic interconnections. Each of the content servers 112 are connected to the Internet 111 thereby making it possible for the IRDs 106 and other internet-accessible devices such as cellular telephones, to download information (e.g., a movie) from the Internet-based content servers 112. In the illustrated example of FIG. 1, the Internet-based content servers 112 locally cache the information provided by the HE 102, and an IRD 106 or other device that may be requesting to download information from the CDN 110 and/or the HE 102 may be re-directed to a specific Internet-based content server 112 for processing and/or communication load balancing purposes.

For example, an Internet uniform resource locator (URL) assigned to a movie may connect an IRD 106 or mobile client to particular Internet-based content server 112. If the particular server 112 currently has a high communication load, the server 112 may re-direct the IRD 106 or mobile client to another Internet-based content server 112 from which the movie should be downloaded. In the interest of clarity and ease of understanding, throughout this disclosure reference will be made to delivering, downloading, transferring and/or receiving information, video, data, etc. via the CDN 110. However, persons of ordinary skill in the art will readily appreciate that information is actually delivered, downloaded, transferred and/or received via one of the Internet-based content servers 112 included in or associated with the CDN 110.

In the example content delivery system 100 (i.e., the example DTH system 100), the CDN 110 may be operated by an external vendor (i.e., the CDN 110 need not be operated by the operator of the HE 102). To download files from the CDN 110, the IRDs 106 and/or mobile devices that are internet-accessible implement, for instance, an Internet protocol (IP) stack with a defined application layer and possibly a download application provided by the CDN vendor. In the illustrated example, file transfers are implemented using standard Internet protocols (e.g., file transfer protocol (FTP), hypertext transfer protocol (HTTP), etc.). Each file received by an IRD 106 or mobile device is checked for completeness and integrity and, if a file is not intact, missing and/or damaged portion(s) of the file are delivered and/or downloaded again. Alternatively, the entire file is purged from the IRD 106 or mobile device, and is delivered and/or downloaded again. Downloads in the illustrated example system 100 may be interrupted (e.g., paused) and then resumed, at a later time, from the point where the interruption occurred.

Security of assets available via the CDN 110 may be established by the broadcast encryption applied to an asset before the asset is provided to the CDN 110 and, thus, the CDN 110 is not necessarily required to apply encryption and/or encoding to an asset. For example, the HE 102 may provide to the CDN 110 the CWP(s) for each broadcast encrypted asset provided to the CDN 110. The CDN 110 then downloads the CWP(s) for the asset to an IRD 106 such that, if the IRD 106 is authorized to view and/or playback the asset, the IRD 106 may correctly determine the CW(s) used to broadcast encrypt the asset. In this way, the authorization to view assets downloaded via the CDN 110 is performed in substantially the same fashion as that performed for live and non-live assets broadcast via the satellite/relay 104. If the security of an asset at the CDN 110 is known by the CDN 110 and/or the HE 102 to be compromised, the HE 102 and/or the CDN 110 make the compromised version of the file unavailable (e.g., by purging the file at the CDN 110) for download by other IRDs 106 until the compromised asset is replaced by the HE 102.

Furthermore, the CDN 110 may determine an IRD's 106 general geographic location based on, for example, an IP address thereby allowing downloads to be restricted to certain geographic areas (e.g., only domestically, only North America, etc.). Additionally or alternatively, the location of an IRD 106 relative to the CDN 110 may be determined by measuring the round trip travel time of a ping transmitted to the IRD 106. The CDN 110 may also limit the number of downloads by any IRD 106 to, for example, a maximum number of downloads per month, and may provide regular reports on download activity to the HE 102.

Example devices 114 coupled to the IRD 106 include a personal computer (PC), a portable media player, a media extender, a game playing system, a media client, a cellular telephone, wireless tablet, etc. As illustrated in FIG. 1, the devices 114 may connect directly to an IRD 106 via any parallel or serial communication system, such as, for example, universal serial bus (USB) connectivity, Institute of Electrical and Electronics Engineers (IEEE) 1394 (a.k.a., Firewire), or via a home network 116. To support import and/or export of secure program material between devices 114 that support any variety of Digital Rights Management (DRM) system and an IRD 106, the example HE 102 of the illustrated example of FIG. 1 is communicatively coupled to a DRM license server 118. An example DRM system is implemented in accordance with the Microsoft® Windows Media®-DRM specification.

The example DTH system 100 of FIG. 1 may include a plurality of satellite/relays 104 to provide wide terrestrial coverage, to provide additional channels and/or to provide additional bandwidth per channel. For example, each satellite/relay 104 may include 16 transponders to receive program material and/or other control data from the HE 102 and to rebroadcast the program material and/or other control data the IRDs 106. However, using data compression and multiplexing techniques, multiple satellites/relays 104 working together can receive and rebroadcast hundreds of audio and/or video channels.

In addition to the delivery of live content (e.g., a TV program) and/or information, the example HE 102 of FIG. 1 is capable of delivering, among other things, a file via the uplink antenna 107, which broadcasts the information via the satellite/relay 104 to the IRDs 106. The file may contain any of a variety of media content types, for instance, audio or video program data (e.g., a movie, a previously recorded TV show, a music video, etc.), control data (e.g., software updates), data service information or web pages, software applications, or program guide information. In the example system 100 the delivery of a file generally includes: (a) binding network addresses to hardware locations, (b) announcing the file and (c) delivering the file. The binding of network addresses to hardware locations allows for files to be sent and received via ubiquitous network addresses, for example, an IP address and IP port number. Announcing the delivery of the file, allows the IRDs 106 to rendezvous with a file broadcast via the satellite/relay 104 at a pre-determined time at the network address to download the file. In particular, announcements describe, in advance, when and how individual files will be delivered. They contain sufficient information about these files to allow the IRDs 106 to determine whether or not to download one or more of the files. To download a file, an IRD 106 joins an IP multicast group at an IP address and pre-determined time specified in an announcement. The IRD 106 re-assembles the data file from the data transmitted to the IP multicast group as received via the receive (i.e., downlink) antenna 108.

As illustrated in FIG. 1, the example pay content delivery system 100 has two primary data and/or information delivery mechanisms: (a) wireless via the satellite/relay 104 and (b) via the CDN 110 (e.g., Internet-based delivery). Content delivery may be implemented using a wireless broadband connection (e.g., Institute of Electrical and Electronics Engineers (IEEE) 802.16 (a.k.a. WiMAX), 802.11b, 802.11g, etc.), a broadband wired connection (e.g., Asymmetric Digital Subscriber Line (ADSL), cable modems, etc.) or, albeit at potentially a slower speed, using a modem connected to a conventional public switched telephone network (PSTN).

In the illustrated example of FIG. 1, wireless delivery via the satellite/relay 104 may simultaneously include both files (e.g., movies, pre-recorded TV shows, software updates, asset files, etc.) and/or live content, data, programs and/or information. Wireless delivery via the satellite/relay 104 offers the opportunity to deliver, for example, a number of titles (e.g., movies, pre-recorded TV shows, etc.) to virtually any number of customers with a single broadcast. However, because of the limited channel capacity of the satellite/relay 104, the number of titles (i.e., assets) that can be provided during a particular time period is restricted.

In contrast, Internet-based delivery via the CDN 110 can support a large number of titles, each of which may have a narrower target audience. Further, Internet-based delivery is point-to-point (e.g., from an Internet-based content server 112 to an IRD 106 or mobile client via a data request) thereby allowing each user of an IRD 106 to individually select titles. In the illustrated example of FIG. 1, allocation of a title to satellite and/or Internet-based delivery depends upon a target audience size and may be adjusted over time. For instance, a title having high demand (i.e., large initial audience) may initially be broadcast via the satellite/relay 104, then, over time, the title may be made available for download via the CDN 110 when the size of the target audience or the demand for the title is smaller. A title may simultaneously be broadcast via the satellite/relay 104 and be made available for download from the CDN 110 via the Internet 111.

In the example DTH system 100, each asset (e.g., program, title, TV program, etc.) is pre-packetized and, optionally, pre-encrypted and then stored as a data file (i.e., an asset file). Subsequently, the asset file may be broadcast via the satellite/relay 104 and/or sent to the CDN 110 for download via the CDN 110 (i.e., Internet-based delivery). In particular, if the data file is broadcast via the satellite/relay 104, the data file forms at least one payload of a resultant satellite signal. Likewise, if the data file is available for download via the CDN 110, the data file forms at least one payload of a resultant Internet signal.

It will be readily apparent to persons of ordinary skill in the art that even though at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and (b) transmission medium dependent. For example, transmission protocols (e.g., transmission control protocol (TCP)/IP, user datagram protocol (UDP), encapsulation, etc.) and/or modulation techniques (e.g., quadrature amplitude modulation (QAM), forward error correction (FEC) employed, etc.) used to transmit a file via Internet signals (e.g., over the Internet 111) may differ from those used via satellite (e.g., the satellite/relay 104). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

Example Headend Implementation

Figure 2:
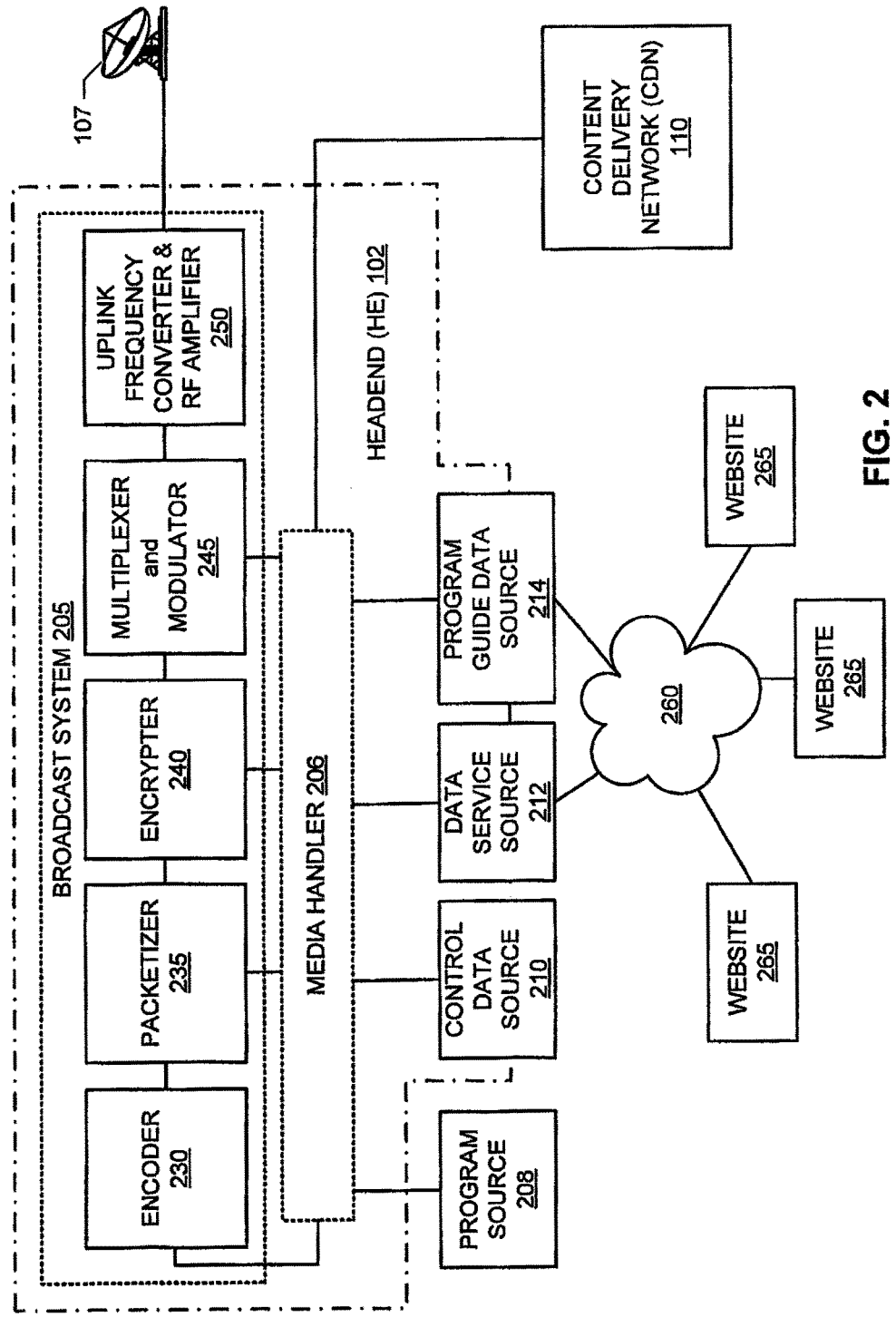
FIGS. 2 and 3 illustrate example manners of implementing the example headend (HE) of FIG. 1.

FIG. 2 illustrates an example manner of implementing the HE 102 of FIG. 1. The example HE 102 of FIG. 2 includes a broadcast system 205, a media handler 206 and a plurality of media sources that provide content, data and/or information (e.g., program sources 208, a control data source 210, a data service source 212, and one or more program guide data sources 214).

As illustrated in FIG. 2, the data sources 210, 212 and/or 214 may be implemented partially or wholly by the HE 102 depending upon an implementation of the HE 102. The example broadcast system 205 and the uplink antenna 107 form a satellite broadcast transmitter. An example media handler 206 is discussed in more detail below in connection with FIG. 3. In one example, information (e.g., files, bitstreams, etc.) from one or more of the sources 208-214 is passed by the media handler 206 to an encoder 230. In the illustrated example of FIG. 2, the encoder 230 encodes the data according to the CableLabs® Video-on-Demand (VoD) encoding specification MD-SP-VOD-CEP-I01-040107 (i.e., performs asset encoding). The encoded data is then packetized into a stream of data packets by a packetizer 235 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by an encrypter 240 using, for example, the well-known Advanced Encryption Standard (AES) or the well-known Data Encryption Standard (DES). In an example, only the payload portion of the data packets are encrypted thereby allowing an IRD 106 to filter, route and/or sort received broadcast encrypted data packets without having to first decrypt the encrypted data packets. To facilitate broadcast of the encrypted bitstream, the encrypted bitstream passes from the encrypter 240 to a multiplexer and modulator 245 that, using any of a variety of techniques, multiplexes any number of encrypted bitstreams together and then modulates a carrier wave with the multiplexed encrypted bitstreams. The modulated carrier wave is then passed to any variety of uplink frequency converter and radio frequency (RF) amplifier 250, which, using any of a variety of techniques, converts the modulated carrier wave to a frequency band suitable for reception by the satellite/relay 104 and applies appropriate RF amplification. The up-converted and amplified signal is then routed from the uplink frequency converter 250 to the uplink (i.e., transmit) antenna 107 where it is transmitted towards the satellite/relay 104.

While a particular broadcast system 205 is illustrated in FIG. 2, persons of ordinary skill in the art will readily appreciated that broadcast systems may be implemented using any of a variety of other and/or additional devices, components, circuits, modules, etc. Further, the devices, components, circuits, modules, elements, etc. illustrated in FIG. 2 may be combined, re-arranged, eliminated and/or implemented in any of a variety of ways. For example, multiplexing of the packetized data may be performed prior to encryption of the data packets by the example encrypter 240. In such an example configuration, the encrypter 240 is configurable to selectively encrypt data packets based upon which data packet stream (e.g., media source) they are associated with.

As discussed above, content, data and/or information provided by the sources 208-214 may be live, real time and/or non-real time. For example, a first program source 208 may provide a live TV program while a second program source 208 provides a previously recorded title (e.g., a movie, a music video, etc.). In the illustrated example of FIG. 2, if a movie provided by the second program source 208 is pre-encoded, pre-packetized and pre-encrypted, the movie may be provided by the media handler 206 directly to the example multiplexer/modulator 245. In particular, the example broadcast system 205 of FIG. 2 may be implemented and/or operated to broadcast both live and/or real time data and/or information and non-real time data and/or information. In the illustrated example of FIG. 2, the operation and/or implementation of the multiplexer/modulator 245 and the uplink frequency converter/RF amplifier 250 are agnostic to whether the broadcast represents real time or non-real time data and/or information. Further, the format and/or structure of the payload of the signal being broadcast toward the satellite/relay 104 by the broadcast system 205 and the transmit (i.e., uplink) antenna 107 and received by the IRD 106 does not depend on whether the data and/or information is real time or non-real time. Moreover, an output of, for example, the example packetizer 235 and/or the example encrypter 240 of FIG. 2 may be captured and/or recorded by the media handler 206 to, for example, an asset file. Like other asset files created by the media handler 206, the example media handler 206 may provide such asset files to the CDN 110 for transfer to an IRD 106 via the Internet 111 and/or broadcast the asset file via the satellite/relay 104. In this way, the broadcast system 205 may implement functionality similar and/or identical to the example video transport processing system (VTPS) 320 discussed below in connection with FIG. 3.

As discussed above in connection with FIG. 1, the example HE 102 may provide programs (e.g., movies, pre-recorded TV shows, etc.) to the CDN 110 for delivery to an IRD 106. In particular, the example media handler 206 of FIG. 2 may provide a pre-encoded, pre-packetized and, optionally, pre-encrypted bitstream to the CDN 110. Further, in the illustrated example HE 102 of FIG. 2 and/or, more generally, the example DTH system 100 of FIG. 1, how a title is pre-encoded, pre-packetized and, optionally, pre-encrypted does not depend upon whether the title will be broadcast via a satellite/relay 104 or made available for download via the CDN 110.

The program sources 208 receive video and audio programming from a number of sources, including satellites, terrestrial fiber optics, cable, or tape. The video and audio programming may include, but is not limited to, television programming, movies, sporting events, news, music or any other desirable content. The program sources 208 may provide the video and audio programming in the form of, for example, a bitstream or a file.

The control data source 210 passes control data to the media handler 206 such as, for example, data representative of a list of SCIDs to be used during the encoding process, or any other suitable information.

The data service source 212 receives data service information and web pages made up of data files, text files, graphics, audio, video, software, etc. Such information may be provided via a network 260. In practice, the network 260 may be the Internet 111, a local area network (LAN), a wide area network (WAN) or a PSTN. The information received from various sources is compiled by the data service source 212 and provided to the media handler 206. For example, the data service source 212 may request and receive information from one or more websites 265. The information from the websites 265 may be related to the program information provided to the media handler 206 by the program sources 208, thereby providing additional data related to programming content that may be displayed to a user at an IRD 106.

The program guide data source 214 provides information that the IRDs 106 use to generate and display a program guide to a user, wherein the program guide may be a grid guide that informs the user of particular programs that are available on particular channels at particular times. The program guide also includes information that an IRD 106 uses to assemble programming for display to a user. For example, if the user desires to watch a baseball game on his or her IRD 106, the user will tune to a channel on which the game is offered. The program guide contains information required by an IRD 106 to tune, demodulate, demultiplex, decrypt, depacketize and/or decode selected programs.

Figure 3:
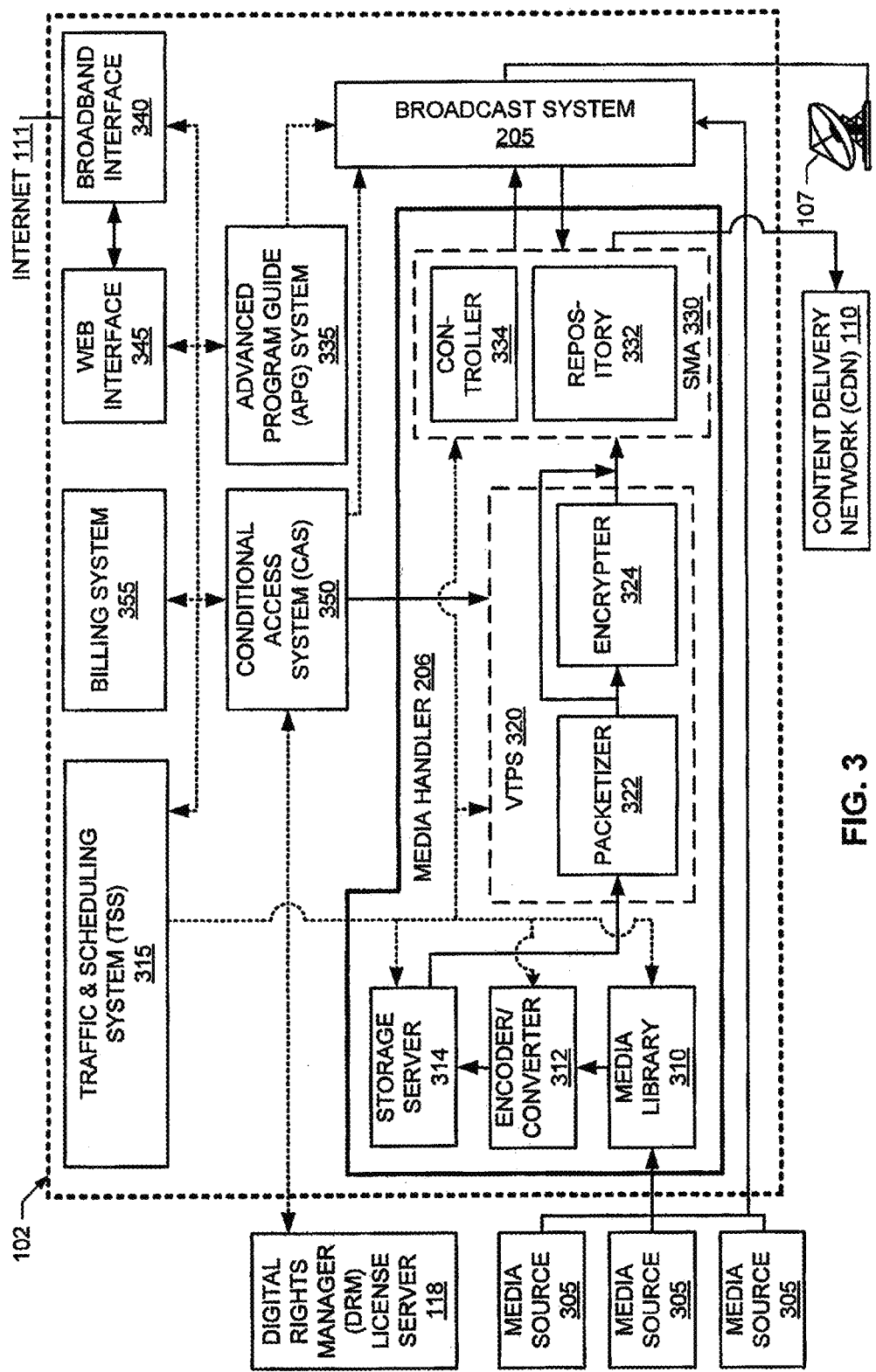

FIG. 3 illustrates another example manner of implementing the HE 102 of FIG. 1 and, in particular, an example manner of implementing the media handler 206 of FIG. 2. While a particular HE 102 and media handler 206 are illustrated in FIG. 3, persons of ordinary skill in the art will readily appreciated that head ends and/or media handlers may be implemented using any of a variety of other and/or additional devices, components, circuits, modules, etc. Further, the devices, components, circuits, modules, elements, etc. illustrated in FIG. 3 may be combined, re-arranged, eliminated and/or implemented in any of a variety of ways.

The example HE 102 of FIG. 3 receives live or non-live video content (e.g., movies, TV shows, sporting events, etc.) from a plurality of media sources 305. The media sources 305 may be, for example, any of the sources 208-214 discussed above in connection with FIG. 2. The media sources 305 deliver content to the HE 102 via any of a variety of techniques, for example, satellite, tape, CD, DVD, file transfer, etc. For instance, a media source 305 first performs encoding and packaging of an asset and then transmits the packaged asset via satellite to the HE 102. The HE 102 receives the packaged asset and checks to ensure the asset was delivered in its entirety without corruption. If the asset was not correctly received, the HE 102 can request re-transmission. To store the received assets (packaged or not), the example media handler 206 of FIG. 3 includes a media library 310. As illustrated in FIG. 3, live assets (e.g., a live TV program) can be routed directly from a media source 305 to the broadcast system 205 for broadcast via the satellite/relay 104 to the IRDs 106. Live assets may, alternatively or additionally, be recorded in a media library 310 and then converted to a pre-encoded, pre-packetized and, optionally, pre-encrypted distribution files as discussed below.

In the illustrated example HE 102 of FIG. 3 and the example pay content delivery system 100 of FIG. 1, video content (i.e., video assets) are encoded and packaged according to the CableLabs specification for VoD content. To pre-encode and pre-package received video assets that are not received pre-encoded and pre-packaged according to the CableLabs specification for VoD content, the example media handler 206 of FIG. 3 includes an encoder/converter 312. The example encoder/converter 312 of FIG. 3 either pre-encodes an un-encoded received asset or converts/re-encodes an asset that is encoded based on another specification and/or standard. For example, an asset received via tape will require pre-encoding and pre-packaging. To store the properly pre-encoded and pre-packaged assets, the illustrated example media handler 206 includes a storage server 314.

To pre-packetize the pre-encoded asset to one of any variety of formats suitable for distribution (e.g., an asset file) and, optionally, to pre-encrypt the asset file, the example media handler 206 of FIG. 3 includes a content transport processing system such as, for example, for video content the VTPS 320 comprising a packetizer 322 and an encrypter 324. Of course, other types of content transport processing systems may be included for other types of content data. Additionally or alternatively, a single content transport processing system capable to process multiple types of content data may be implemented. Among other things, the example packetizer 322 of FIG. 3 pre-packetizes the pre-encoded asset. The example encrypter 324 of FIG. 3 pre-encrypts the pre-packetized stream according to, for example, either the AES or the DES standard. The codeword (CW) used to broadcast encrypt the pre-packetized asset is determined, as described above, by a conditional access system (CAS) 350.

In the illustrated example HE 102 of FIGS. 1 and 3, an asset file contains pre-encoded pre-packetized and, optionally, pre-encrypted video data. Additionally or alternatively, as discussed above in connection with FIG. 2, outputs of the broadcast system 205 (e.g., an output of the packetizer 235 and/or the encrypter 240) may be used to create pre-packetized and/or pre-encoded assets. For example, such outputs of the broadcast system 205 may be used to, for example, create asset files for live programs currently being broadcast by the HE 102. That is, the broadcast system 205 may be used, in addition to broadcast live and non-live programs, to implement a VTPS, VTPS functionality and/or functionality similar to the VTPS 320. The example media handler 206 can handle asset files created by the VTPS 320 identically to those created from outputs of the broadcast system 205. To store asset files, the example media handler 206 of FIG. 3 includes a service management and authoring system (SMA) 330.

It will be readily apparent to persons of ordinary skill in the art that content processing, that is, the processes of pre-encoding, pre-packetizing and, optionally, pre-encrypting assets to form asset files may be performed in non-real time. Preferably, content processing is implemented as an automated workflow controlled by a traffic and scheduling system (TSS) 315. In particular, the TSS 315 can schedule content processing for a plurality of received assets based upon a desired program lineup to be offered by the example DTH system 100 of FIG. 1. For example, a live TV program for which a high demand for reruns might be expected could be assigned a high priority for content processing.

In the illustrated example of FIG. 3, the SMA 330 implements a store and forward system. That is the SMA 330 stores all asset files (i.e., distribution files) until they are scheduled to be broadcast via satellite and/or scheduled to be transferred to the CDN 110. In the example HE 102 of FIGS. 1-3, an asset is stored using the same distribution file format regardless of how the asset is to be delivered to the IRDs 106. This enables the same assets to be forwarded to the IRDs 106 via the satellite/relay 104 or via the CDN 110. To control the SMA 330 and to store the distribution files, the example SMA 330 includes a controller 334 and a repository 332, respectively. In the illustrated example of FIG. 3, the SMA 330 is controlled by a traffic schedule determined by the TSS 315, that is, the controller 334 operates responsive to commands received from the TSS 315.

For satellite distribution, the SMA 330, as instructed by the TSS 315, sends an asset file to the broadcast system 205 at a scheduled broadcast time. As described above in connection with FIG. 2, the broadcast system 205 transmits the asset file via the transmit (i.e., uplink) antenna 107 and the satellite/relay 104. In particular, since the asset file is already pre-encoded, pre-packetized and, optionally, pre-encrypted, the asset file is only passed through the multiplexer/modulator 245 and the uplink frequency converter/RF amplifier 250 of the example broadcast system 205 of FIG. 2. As also described above, live assets may be encoded, packetized and broadcast encrypted by the broadcast system 205 and will be multiplexed, modulated, up-converted and amplified using the same techniques as that applied to an asset file. In particular, a live program that is broadcast live via the broadcast system 205 results in a satellite signal that is substantially similar to a satellite signal resulting from broadcast of an asset file created from the live program.

In the illustrated example of FIG. 3, video asset files are sent to the broadcast system 205 as a pre-encoded, pre-packetized and, optionally, pre-encrypted bitstream containing video as well as all audio and conditional access (CA) data in a single file. Video and audio are assigned default SCIDs/PIDs during content processing. The broadcast system 205 may, thus, override the default SCID/PID assignments and may re-stamp SCID/PID data packet header entries with the correct values based on the particular satellite transponder allocated to the asset.

For Internet distribution, the SMA 330, as instructed by the TSS 315, sends an asset file to the CDN 110 at a scheduled time via a dedicated private access line (e.g., a digital signal level 3 (DS-3) communication link, a optical carrier level 3 (OC-3) fiber optic link, etc.) or a secure virtual private network (VPN) link. In the illustrated examples of FIGS. 1-3, the HE 102 sends each asset file to the CDN 110 once and all subsequent copying and distribution of the asset via the Internet 111 is performed by the CDN 110. Asset files received by the CDN 110 are verified to ensure they are received in their entirety and with full integrity. The link between the HE 102 and the CDN 110 has a finite bandwidth and, thus, the TSS 315 schedules delivery of assets to the CDN 110 to ensure that assets are available via the CDN 110 as advertised, for example, in program guide information.

To provide program guide information to the IRDs 106, the example HE 102 of FIG. 3 includes the advanced program guide (APG) system 335. The APG system 335 creates and/or updates APG data that is broadcast to the IRDs 106 via the broadcast system 205 (i.e., via the satellite/relay 104). Example APG data lists which assets are being broadcast by the HE 102 and are, thus, available for recording by the IRDs 106. For the listed assets, the APG data specifies a starting time, a duration, a network address, a satellite transponder identifier and a SCID/PID set. For assets available for download via the CDN 110, the APG, additionally or alternatively, includes an Internet URL from which an IRD 106 may download the asset.

To schedule content processing, APG data updates, as well as content delivery via the broadcast system 205 and/or the CDN 110, the example HE 102 of FIG. 3 includes the TSS 315. For each asset, the following dates (i.e., date and time) may be controlled and/or determined by the TSS 315: (a) expected arrival date, (b) start of content processing, (c) end of content processing, (d) APG announcement date (i.e., from which date the asset will be visible to a customer in the APG), (e) broadcast date, (e) CDN publish date, (f) SMA purge date (i.e., date asset is removed from repository 332), (g) end of availability of purchase, (h) end of viewing (i.e., date of purge from an IRD 106), and (i) CDN 110 purge date. The TSS 315 may control other dates as well.

In the example HE 102 of FIG. 3, each live asset is assigned to a broadcast operations control (BOC) channel by the TSS 315 that denotes the physical location of a program (e.g., a satellite transponder). Likewise, delivery of asset files (i.e., distribution files) via the satellite/relay 104 are also organized by BOC channel. In the illustrated examples of FIGS. 1 and 3, the link between the HE 102 and the CDN 110 is broken up into sub-channels each of which is assigned a BOC channel number. By using BOC channels for both live and non-live assets (even those being broadcast via the CDN 110), the TSS 315 can schedule broadcast and/or delivery of all assets in the same fashion. In particular, the delivery of assets to the CDN 110 is scheduled by the TSS 315 like the broadcast of an asset via the satellite/relay 104 (i.e., by selecting a BOC channel and time). If an example system includes more than one CDN 110, then the CDNs 110 could be assigned distinct BOC channel numbers making the implementation of the TSS 315 easily extendable.

In the example DTH system 100 of FIG. 1, users of the IRDs 106 may be restricted from downloading assets from the CDN 110 and/or from decoding or playing back assets received (either via the satellite/relay 104 or the CDN 110) and/or stored by an IRD 106 (i.e., conditional access to content). To authorize an IRD 106 for downloading, decoding and/or playback of an asset, the example HE 102 of FIG. 3 includes the CAS 350. In an example, the CAS 350 generates and broadcasts CWP(s) and determines the CW(s) used to broadcast encrypt each asset. In another example, the CAS 350 receives an authorization request from an IRD 106 via the Internet 111 and the broadband interface 340, and provides an authorization response to the IRD 106 via the broadcast system 205 and the satellite/relay 104.

In the illustrated example of FIG. 1, users of the IRDs 106 are charged for subscription services and/or asset downloads (e.g., PPV TV) and, thus, the example HE 102 of FIG. 3 includes a billing system 355 to track and/or bill subscribers for services provided by the example pay content delivery system 100. For example, the billing system 355 records that a user has been authorized to download a movie and once the movie has been successfully downloaded the user is billed for the movie. Alternatively, the user may not be billed unless the movie has been viewed.

Data Caching

The present invention provides a multiple stage caching strategy for data delivery in a content delivery system. Typically, this is a two-stage strategy, where the entire data set is retrieved to a server (or point of presence) in a single request, and the data set is then sorted and grouped by category. Depending on the client request through the content delivery system, objects are retrieved and a response, typically an XML, response, is generated and returned to the requesting client, and the XML response is cached and keyed by the requesting URL. Thus, if a similar request is sent again to the server, the cached XML response can be sent directly, and the cached XML response can be refreshed with new data as needed for future requests from various clients.

Such a strategy is particularly useful with regard to sports scores, where the majority of the data, e.g., team, game, sport, etc., is relatively static, and the only changes to the data string/XML response is the change in the score, game time, or field position. As such, the present invention allows for caching of smaller amounts of data, as well as transfer of smaller amounts of data through the communications system, to deliver the information to requesting devices.

Further, a similar approach can be used for file caching. The backend data pre-processing can be performed at a centralized location, e.g., the headend 102, and the output processed data saved as a compressed file (typically a .tar file). This compressed file is then periodically pushed to each currently running instance of the application (e.g., on content servers 112) to avoid performing multiple runs of processing on/by each application instance. This approach of the present invention also ensures data consistency across content servers 112.

The present invention also contemplates caching data for selected portions of the data, sometimes called "data chunks." For example, when a request for data within a date range is received, the response can be a concatenation of individually cached time intervals, e.g., day 1, day 2, day 3, etc.

Figure 4:
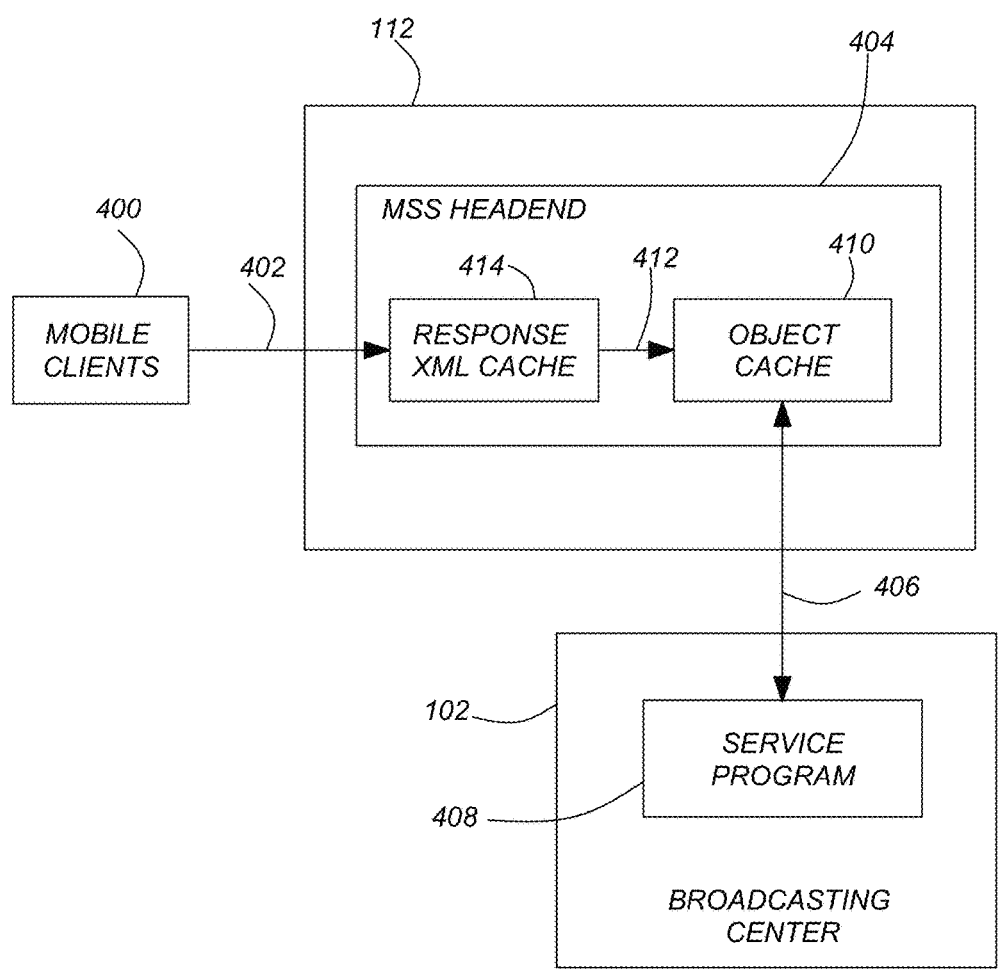
FIG. 4 illustrates a caching strategy and data delivery request in a mobile environment in accordance with one or more embodiments of the present invention.

FIG. 4 illustrates a caching strategy and data delivery request in a mobile environment in accordance with one or more embodiments of the present invention.

A mobile client 400 sends a request 402 (for a service and/or data) to content server 112 (also known as Point of Presence (POP) 112). This request is sent through POP 112 to a Mobile Streaming Service (MSS) headend 404 contained within POP 112. Further the request may be in the form of an HTTP (hypertext transfer protocol) request (e.g., "/service/sg/*").

The POP 112, via the MSS Headend 404, sends requests 406 (e.g., via HTTP) to Headend 102 (also known as a broadcasting center 102 [e.g., Los Angeles Broadcasting Center—LABC]). The Headend 102 combines all of the scores, teams, games, and other data related to possible requests from mobile clients 400 (and/or IRDs 106 that access system 100 via headend 102) and stores them in a service program 408. For example, and not by way of limitation, sports scores, teams, etc. can be stored in a score guide service 408, while television guides, etc. can be stored in a different guide service 408 if desired.

On a periodic basis, or an aperiodic basis if desired, a request 406 is sent from MSS Headend 404 to Headend 102 (e.g., also referred to as back end web services) to request the entire data set from service 408. The received data set/results may be converted into objects (e.g., Java™ objects). The objects may then be sorted and grouped by specific categories of data objects (as desired). For example, the objects may be sorted and grouped by ID (e.g., events may be sorted by sports, teams, etc.). For example, on a Sunday in December, many mobile clients 400 may be interested in National Football League games and scores, and less interested in Major League Baseball news and events. As such, grouping data by sport may assist POP 112 in responding to requests 402 from clients 400. The sorted/grouped objects are stored in the cache 410 (also referred to as object cache 410).

When a request 402 is made, an access request 412 is made to cache 410 which accesses the grouped/categorized data objects by group/category. This avoids individual service calls for each category to see if data objects exist when request 402 did not request them; for example, as in the scenario above, if the request was purely for football scores, baseball scores in cache 410 would not be accessed by access request 412. If the request were only for professional football scores, college and/or high school football score categories would not be accessed in cache 410. By avoiding individual service calls for each category, the scalability of web services is increased.

The specific response to request 402 would then be cached as an XML string (e.g., in Response XML Cache 414) that is keyed by a request URL to avoid unnecessary XML serialization (e.g., the creation/transmission of multiple identical XML responses). Further, caching the response in XML cache 414 by requesting URL decreases the response time to mobile client 400 from POP 112.

This approach of the present invention centralizes Headend 102 data processing, and pushes the output data set (which is sent back to mobile client 400 based on request 402) while maintaining flexibility within system 100. By pushing the output data set to each running instance of the application/headend 404, the same data processing does not need to be performed by each application/headend 404. Further, data consistency across application servers/headends 404 are ensured. This approach of the present invention also reduces redundant cached data in cache 414 and cache 410.

Cache 410 is periodically or aperiodically updated via requests 406 regardless of incoming requests 402. These updates may then forwarded to XML cache 414 (based on URL requests 402 received) such that the speed of response to request 402 will increase and provide lower burdens on the system 100 and on POP 112. The cache 410 can be updated or refreshed at different rates based on the types of data to be cached in cache 410. For example, and not by way of limitation, event data (scores) can be updated every thirty seconds; team data can be updated once per day; zip code mapping or package mapping can be performed once every twelve hours, once per day, etc.

XML cache 414 caches non-user specific XML responses, that are keyed by the requesting URL. For each request, MSS headend 404 checks the XML cache 414 first, and returns the cached string if there is a match to the request (based on URL, requested data, etc.). Otherwise, MSS Headend 404 generates a response from cache 410 based on the request and stores a new XML string in cache 414. Cache 414 can be cleared when cache 410 receives an update from service 408, or the updates can be flowed through to cache 414 if desired.

Caching Strategies

Further, MSS Headend 404 can apply different caching strategies based on the size and usage of the data that is to be transferred to mobile clients 400 and/or the frequency of requests 402.

If the data returned by service 408 is of a large size and will be heavily used by clients 400, then MSS Headend 404 can apply a multiple stage caching strategy as shown in FIG. 4.

Figure 5:
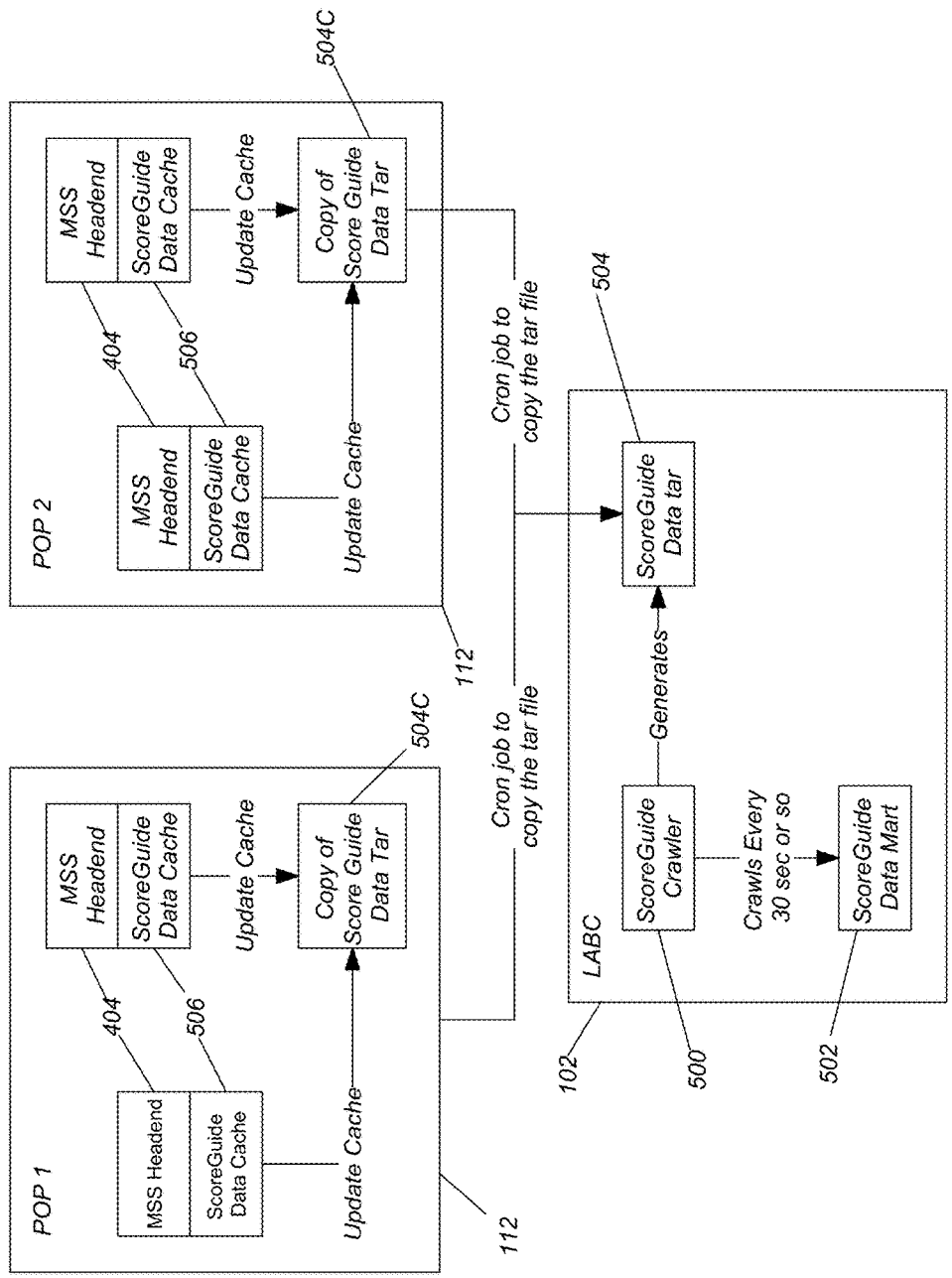
FIG. 5 illustrates a static data response service in accordance with one or more embodiments of the present invention.

If the data that is returned by service 408 is relatively static, and is not used as often (e.g., the number of requests 402 is relatively low), then MSS Headend 404 can apply a back end object cache strategy for such data types as shown in FIG. 5.

FIG. 5 illustrates a static data response service in accordance with one or more embodiments of the present invention.

A standalone crawler application 500 is run at the headend 102, typically the same server that runs service program 408, and crawler 500 periodically runs through data mart 502 to retrieve events, sports, teams data, etc. and filters out unneeded information. The remaining data is then saved as tree structured XML files and compressed into a file 504, typically a .tar file.

The Headend 102 either pushes the file 504 to the POPs 112 (as copies of the file 504C), or each centralized POP 112 location retrieves the file 504 and disseminates the file 504 to the individual servers at each POP 112 location when a new file 504 is created.

The MSS Headend 404 then separates file 504 (e.g., un-tars the file 504) and load/overwrite the XML data into cache memory 506, typically in a similar manner as described with respect to FIG. 4, e.g., as a hash table that is keyed by event ID, sport ID, team ID, date, etc.

Depending on the request 402, MSS Headend 404 then selects the XML objects from the cache 506 and concatenates them together, removes duplication, sorts by date, then returns the final XML string to clients 400. In this regard, data cache of FIG. 5 may be reflected in FIG. 4 as XML cache 414.

Many web services that require caching are parameterized by customizable periods of time. Such data can be cached effectively using the present invention regardless of the requested time period.

The present invention comprises caching, in cache 506, cache 410, cache 414, or any other cache memory at POP 112, for a set time period. The smaller the granularity of the time period, the more processing is required, while the greater the granularity, the less flexibility is allowed in system 100. Typically, the time period cached is not greater in granularity than request 402.

When a time period is requested in request 402, the MSS Headend 404 finds the individual caches for each section of the requested time period, then aggregates the data strings in each cache into a response. This allows the cache 410, cache 414, and cache 506 to update itself at any frequency while keeping the redundancy of data to a minimum. This is in contrast to traditional request caching where the request parameters determine which data is cached. If overlapping time periods have been requested, the overlap of the two time periods would contain redundant datasets and thus require a larger cache memory size.

For example, and not by way of limitation, an event web service is available that asks for all events from Oct. 20, 2010 for 10 days (e.g., using an HTTP request such as "http://domain/events?startdate=2010-10-20&duration-days=10"). A second request might ask for all events from Oct. 25, 2010 for 5 days (e.g., using an HTTP request such as "http://domain/events?startdate=2010-10-25&duration-days=5"). If both of these events are cached, the overlap of data would be all entries from October $25^{th}$ through October $30^{th}$. With the data caching mechanism of the present invention, a smaller granularity, e.g., a single day or each set of entries for each day, would be cached. Thus, there would be entries for the $20^{th}$, $21^{st}$, $22^{nd}$, $23^{rd}$, etc. Once a request has been made, the response is generated by concatenating the individual elements identified in the request together; i.e., for the first request, the data for the $20^{th}$, $21^{st}$, . . . $30^{th}$ would be aggregated and concatenated and sent to the requesting client 400, while the second request would start at the $25^{th}$, $26^{th}$, etc., and concatenate those results for a different client 400. The start date and the duration will determine the cache elements that are used.

Process Chart

Figure 6:
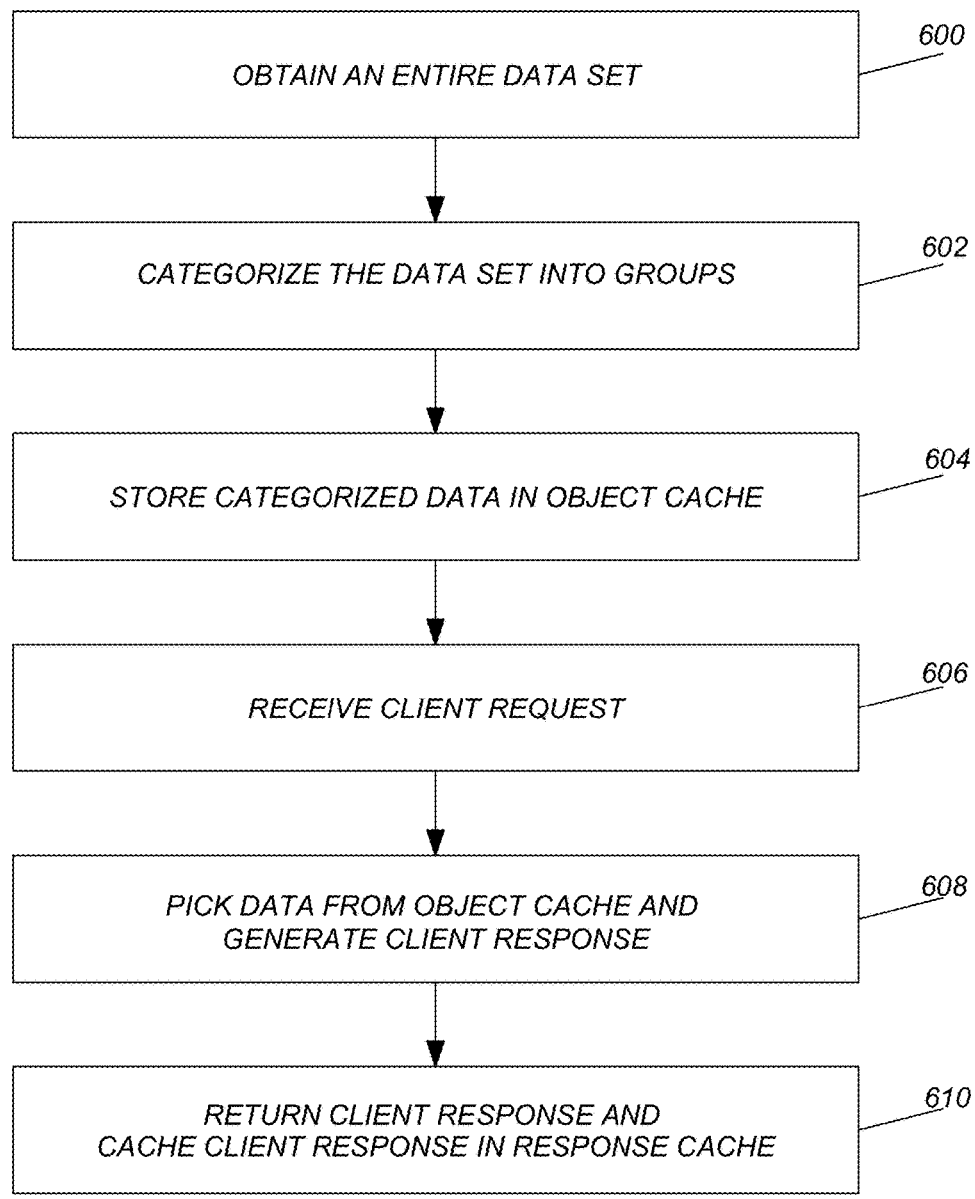
FIG. 6 illustrates the logical flow for sending requested data to a client based on a client request in accordance with one or more embodiments of the present invention.

FIG. 6 illustrates the logical flow for sending requested data to a client based on a client request in accordance with one or more embodiments of the present invention.

At step 600, an entire data set is compiled (e.g., by a server) and obtained at a headend. The entire data set may either be pushed from the server to the headend or retrieved from the server via a single request.

At step 602, the data set is categorized into groups.

At step 604, the categorized data set is stored in an object cache. Such an object cache may be periodically refreshed (e.g., new entire data sets may obtained) based on a type of the data in the data set. When a refresh occurs, all of the data in the response cache may be cleared.

At step 606, a client request is received from the client.

At step 608, based on the client request, data is picked from the object cache and a client response (e.g., an XML string) is generated with the picked data. Further, the data in the response cache may be non-static data that is frequently used by clients.

At step 610, the client response is returned to the client (e.g., a mobile client) and the client response is cached in a response cache. The response cache is used to directly respond to future client requests. The client responses may be keyed by a request URL in the response cache. Further, the client response may be a concatenation of a plurality of picked data from the object cache. For example, the data set may be categorized into groups based on a customizable period of time, the client request may be for a different period of time, and the client response may be a concatenation of the groups based on the requested period of time.

A data crawler may also be used (that is coupled to the data cache) that is configured to crawl a database to retrieve information, filter out unneeded information, store the filtered information in tree-structured files, and compress the tree-structured files into a compressed file (that is equivalent to the entire data set).

CONCLUSION

This concludes the description of the preferred embodiment of the invention. The present invention discloses systems and methods for sending requested data to a client based on client requests.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the equivalents thereof.

What is claimed is:

1. A content delivery system for sending requested data to a client based on a client request, comprising:
   (a) a broadcasting center comprising a transmission source and a data crawler, wherein the broadcasting center compiles an entire data set, and wherein the data crawler:
      (1) crawls the entire data set to retrieve information;
      (2) filters out any unneeded information from the retrieved information leaving remaining information;
      (3) stores the remaining information in tree-structured files; and
      (4) compresses the tree-structured files into a compressed file;
   (b) a headend within a point of presence (POP), that communicates with the broadcasting center, wherein the headend:
      (1) obtains the compressed file from the broadcasting center;
      (2) uncompresses the compressed file to create an uncompressed file;
      (3) loads the remaining information into cache memory;
      (4) receives the client request from the client;
      (5) based on the client request, generates a client response by:
         (i) picking data from the remaining information in the cache memory;
         (ii) concatenating the picked data;
         (iii) removing duplication of the picked data;
         (iv) sorting the picked data; and
         (v) generating a response string; and
      (6) returns the client response to the client.

2. The content delivery system of claim 1, wherein the compressed file is pushed from the broadcasting center to the headend.

3. The content delivery system of claim 1, wherein:
   the compressed file is retrieved from the broadcasting center;
   the compressed file is disseminated to an individual server at each POP upon creation of the compressed file.

4. The content delivery system of claim 1, wherein the headend loads the remaining information to cache memory as a hash table.

5. The content delivery system of claim 4, wherein the hash table is keyed by sports related information.

6. The content delivery system of claim 1, wherein:
   the data is picked from the cache memory as one or more extensible markup language (XML) objects; and
   the client response comprises an XML string.

7. The content delivery system of claim 1, wherein:
   the remaining information is categorized into groups, in the cache memory, based on a customizable period of time;
   the client request is for a period of time; and
   the client response comprises a concatenation of one or more of the groups based on the requested period of time.

8. The content delivery system of claim 1, wherein:
   a multiple stage caching strategy is implemented and consists of two different caches;
   a first cache of the two different caches comprises the compressed file;
   a second cache of the two different caches comprises the remaining information that is loaded into cache memory; and
   the picked data is selected from the cache memory, wherein determining which picked data to select from the cache memory is based on the client request.

9. The content delivery system of claim 1, wherein:
   the entire data set is crawled on a periodic basis; and
   the crawling results in a new compressed file that is obtained by the headend.

10. A method for caching data in response to a client request, comprising:
   obtaining an entire data set from a server;
   crawling the entire data set to retrieve information;
   filtering out any unneeded information from the retrieved information leaving remaining information;
   storing the remaining information in tree-structured files;
   compressing the tree-structured files into a compressed file;
   obtaining the compressed file across a network;
   uncompressing the compressed file to create an uncompressed file;
   loading the remaining information into cache memory;
   receiving the client request from the client;
   based on the client request, generating a client response by:
      picking data from the remaining information in the cache memory;
      concatenating the picked data;
      removing duplication of the picked data;
      sorting the picked data; and
      generating a response string; and
   returning the client response to the client.

11. The method of claim 10, wherein the compressed file is pushed from a broadcasting center to a headend.

12. The method of claim 10, wherein:
the compressed file is retrieved from a broadcasting center;
the compressed file is disseminated to an individual server at each POP within a headend upon creation of the compressed file.

13. The method of claim 10, wherein the remaining information is loaded to cache memory as a hash table.

14. The method of claim 13, wherein the hash table is keyed by sports related information.

15. The method of claim 10, wherein:
the data is picked from the cache memory as one or more extensible markup language (XML) objects; and
the client response comprises an XML string.

16. The method of claim 10, wherein:
the remaining information is categorized into groups, in the cache memory, based on a customizable period of time;
the client request is for a period of time; and
the client response comprises a concatenation of one or more of the groups based on the requested period of time.

17. The method of claim 10, wherein:
a multiple stage caching strategy is implemented and consists of two different caches;
a first cache of the two different caches comprises the compressed file;
a second cache of the two different caches comprises the remaining information that is loaded into cache memory; and
the picked data is selected from the cache memory, wherein determining which picked data to select from the cache memory is based on the client request.

18. The method of claim 10, wherein:
the entire data set is crawled on a periodic basis; and
the crawling results in a new compressed file that is obtained by the headend.

* * * * *